United States Patent [19]

Nakata

[11] Patent Number: 5,293,368
[45] Date of Patent: Mar. 8, 1994

[54] APPARATUS FROM REPRODUCING ADDRESS DATA ON A DISK

[75] Inventor: Tadashi Nakata, Kanagawa, Japan

[73] Assignee: Sony Corporation, Tokyo, Japan

[21] Appl. No.: 749,110

[22] Filed: Aug. 23, 1991

[30] Foreign Application Priority Data

Sep. 4, 1990 [JP] Japan ............................ 2-233593

[51] Int. Cl.⁵ .................................................. G11B 7/00
[52] U.S. Cl. .................................... 369/48; 369/59
[58] Field of Search ............... 369/44.26, 44.32, 44.34, 369/32, 59, 54, 124, 48, 49

[56] References Cited

U.S. PATENT DOCUMENTS

| | | | |
|---|---|---|---|
| 4,744,069 | 5/1988 | Sugiyama et al. | 369/44.29 |
| 4,751,695 | 6/1988 | Kaku et al. | 369/44.26 |
| 4,907,216 | 3/1990 | Rijnsburger. | |

FOREIGN PATENT DOCUMENTS

| | | |
|---|---|---|
| 0414518A2 | 2/1991 | European Pat. Off. . |
| 3622239A1 | 1/1987 | Fed. Rep. of Germany . |

*Primary Examiner*—Donald E. McElheny, Jr.
*Attorney, Agent, or Firm*—Charles P. Sammut

[57] ABSTRACT

An apparatus for reproducing address data recorded on a disk record medium with an information signal which is recorded on the same by forming pit portions in response to the information signal included a pickup for optically reproducing the recorded data and signals is provided. Also the apparatus includes a circuit for generating a sampling pulse from the recorded data and signals so that the sampling pulse occurs substantially beginning position of a mirror portion beginning the pit portions, a circuit for sampling and holding the recorded data and signals by the sampling pulse, and a circuit for decoding an output signal of the sampling and holding means so as to generate the address data.

3 Claims, 3 Drawing Sheets

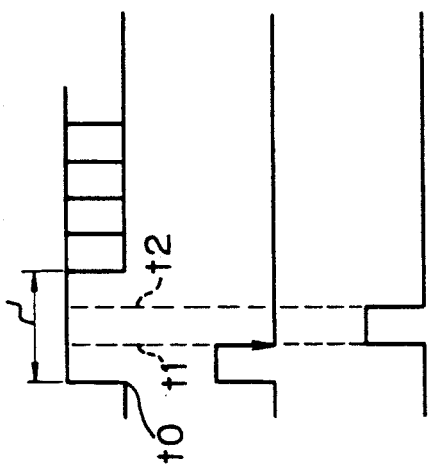
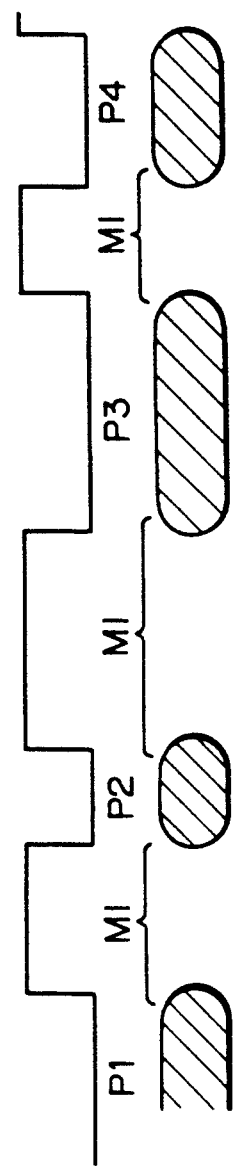

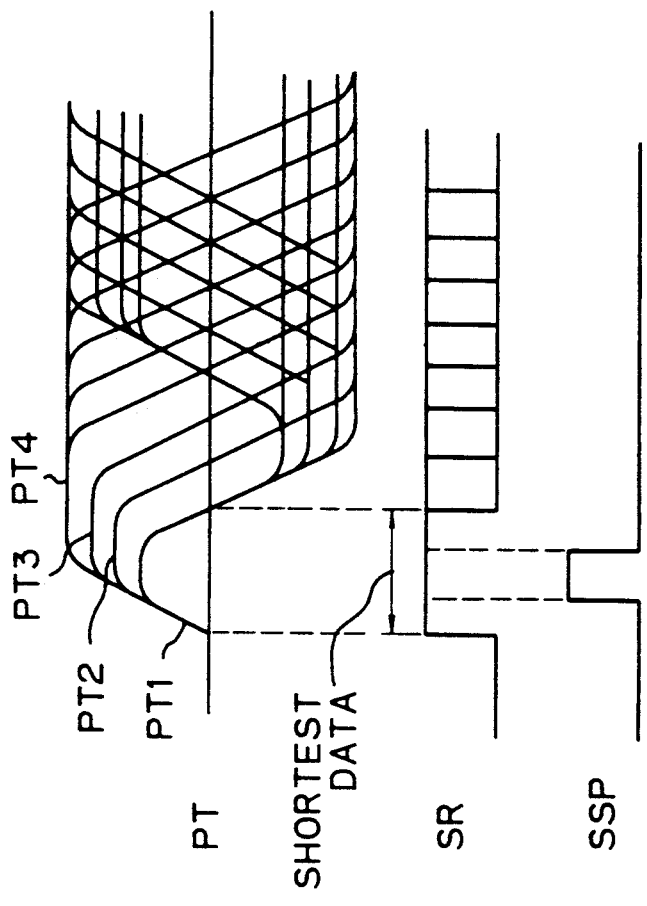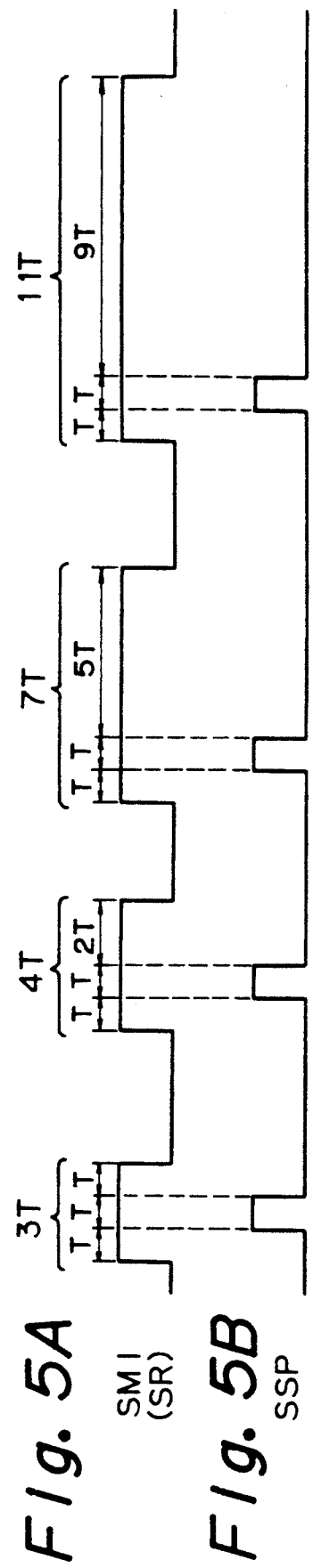
Fig. 4A
Fig. 4B
Fig. 4C
Fig. 5A
Fig. 5B

APPARATUS FROM REPRODUCING ADDRESS DATA ON A DISK

BACKGROUND OF THE INVENTION

1. Field of the Invention

The present invention relates to a playback apparatus suitable for reproducing address data from a disk record medium, in particular, from a recordable optical disk.

2. Description of the Prior Art

Some optical disks having wobbled grooves are known. The grooves are wobbled with a particular signal, for example, a carrier signal of 22.05 KHz. They are used to perform CLV control. Moreover, a particular optical disk where the carrier signal is frequency-modulated with absolute time data, which is so-called ATIP (Absolute Time In Pre-groove) so as to form the above mentioned grooves in accordance with the FM signal, has been proposed. In this optical disk, absolute time data from the start track to the last track which is represented with ATIP is used as address information. By accurately reading ATIP, a particular position can be located on a recordable optical disk. ATIP is included in a push-pull signal which is formed with reflected light from the optical disk and ATIP is read by decoding the push-pull signal.

When a signal obtained from an optical disk through a pickup is detected and reproduced, if a push-pull signal is formed in accordance with reflected light of a pit portion, a signal component being recorded leaks in the push-pull signal. Thus, the C/N of the push-pull signal deteriorates and thereby getting into difficulty for reproducing ATIP.

For example, in the case of a CD-WO on which an EFM signal is recorded, the spectrum of the ATIP signal is centered at a frequency of 22.05 KHz±1 KHz. On the other hand, the EFM signal being reproduced is a pulse train with a frequency ranging from 200 to 720 KHz. The low band component of the EFM signal is also present in the band of the ATIP signal, thereby deteriorating the C/N.

In addition, as described earlier, since a particular position is located on the recordable optical disk in accordance with ATIP, when it is difficult to reproduce ATIP, a particular position cannot be located. Consequently, data cannot be recorded on the recordable optical disk. In addition, designated data cannot be recorded additionally in a designated position. Thus far, the measures against this problem has been required.

OBJECTS AND SUMMARY OF THE INVENTION

It is, therefore, an object of the present invention to provide a reproducing apparatus for reading address data such as ATIP with high accuracy.

According to an aspect of the invention, there is provided an apparatus for reproducing an address data recorded on a disk record medium with an information signal which is recorded on the same by forming pit portions in response to the information signal comprising;

pickup for optically reproducing the recorded data and signals, circuit for generating a sampling pulse from the recorded data and signals so that the sampling pulse occurs at substantially beginning position of a mirror portion between the pit portions, circuit for sampling and holding the recorded data signals by the sampling pulse, and decoder for decoding an output signal of the sampling and holding means so as to generate the address data.

The above, and other, objects, features and advantages of the present invention will become readily apparent from the following detailed description thereof which is to be read in connection with the accompanying drawings.

BRIEF DESCRIPTION OF THE DRAWING

FIGS. 2A-2C are a timing chart showing a state where a sampling pulse is formed;

FIGS. 3A and 3B are a schematic showing the relationship among a record signal, pits, and mirror surfaces;

FIGS. 4A, 4B and 4C are a schematic diagram showing the relationship among a signal, eye patterns, and a sampling pulse; and FIGS. 5A and 5B are a timing chart showing a timing of an EFM signal with various invert intervals and a sampling pulse.

DETAILED DESCRIPTION OF THE PREFERRED EMBODIMENTS

Figure 1:
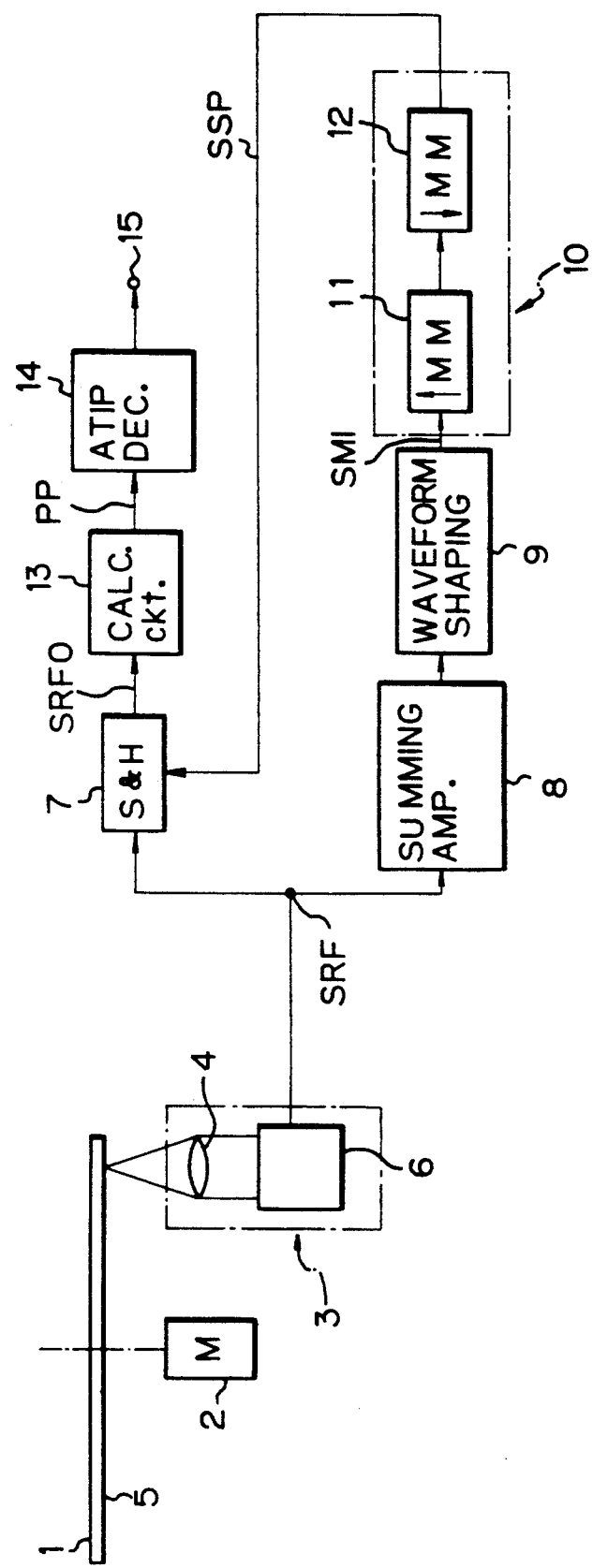
FIG. 1 is a block diagram showing an embodiment according to the present invention.

Now, with reference to FIGS. 1 to 5, an embodiment according to the present invention will be described.

In the construction shown in FIG. 1, an optical disk 1 is rotated by a motor 2. Laser light emitted from an optical pickup 3 is focused on a pit formed surface 5 of the optical disk 1 with an object lens 4, the pit formed surface 5 having a pit P. The optical disk 1 is of a phase change type, where data is recordable.

FIG. 3 shows the relationship between a record signal SR which is EFM modulated and the pit P formed in a groove of the pit formed surface 5. Pits P1 to P4 are formed in accordance with a low level, namely, a black level of the record signal SR. On the other hand, a mirror surface MI is formed in accordance with a high level of the record signal SR.

The laser light which is reflected by the pit formed surface 5 on the optical disk 1 is focused on a detector 6 in the optical pickup 3, for example, a two-divided detector. In this embodiment, the two-divided detector is used. However, the present invention is not limited to such a two-divided detector. Rather, it is possible to use a four-divided detector.

A playback RF signal SRF for each divided area of the detector 6 is sent to a sample and hold circuit 7 and a summing amplifier 8. The summing amplifier 8 sums the playback RF signal SRF which is output from each divided portion of the detector 6 and then forms an analog summing signal. The summing signal is sent to a waveform shaping circuit 9. The waveform shaping circuit 9 shapes the waveform of the analog summing signal and converts the resultant signal into a digital signal. Thus, a mirror surface detection signal SMI for detecting the mirror surface MI shown in FIG. 3 is formed. The mirror surface detection signal SMI is sent to a sampling pulse generation circuit 10.

The sampling pulse generation circuit 10 is composed of monostable multi-vibrators (hereinafter named the mono-multis) 11 and 12 which are serially connected. As shown in FIG. 2, the sampling pulse generation circuit 10 forms a sampling pulse SSP in accordance with the mirror surface detection signal SMI.

As shown in FIG. 2A, at a leading edge of the mirror surface detection signal SMI which is output from the waveform shaping circuit 9, the mono-multi 11 is triggered. A signal which goes high for a particular time period as shown in FIG. 2B is sent to the mono-multi 12 which is disposed in the next stage thereof. The mono-multi 12 is triggered at a trailing edge of a signal sent from the mono-multi 11. The mono-multi 12 outputs a sampling pulse SSP which goes high for a particular time period as shown in FIG. 2C and sends it to the sample and hold circuit 7. The sample and hold circuit 7 holds the RF signal SRF which is sent from each divided portion of the detector 6 in the timing when the sampling pulse SSP is sent. This timing is defined so that the mirror surface MI as shown in FIG. 3 is always sampled.

At the portions of the pits P1 to P4, the reflected light from the optical disk 1 is scattered. When the push-pull signal Pp is formed while the reflected light is scattered, the data component prevents the push-pull signal from being accurately reproduced. Thus, ATIP cannot be accurately reproduced.

However, when the RF signal SRF reflected from the mirror surface MI whose reflection factor is 100 % and which does not form the pit P is sampled and then the push-pull signal is formed in accordance with the resultant signal, the C/N can be further improved and thereby reducing the adverse effect of the data component. To securely sample the signal in the position of the mirror surface MI, for example, as shown in FIG. 2, when the leading edge of the mirror surface detection signal SMI is termed t0, the signal should be sampled in a particular time period ranging from t1 to t2 which is the center portion of the shortest data.

Thus, when a pulse which goes high ("1") in the particular time period ranging from t1 to t2, which is the center portion, is formed by the mono-multi 12 as the sampling pulse SSP, the signal can be sampled in a desired timing.

In this case, when the time period of the high state of the sampling pulse SSP is one data bit time period T and the length of the shortest data shown in FIG. 2 is 3T of the minimum invert time period of EFM, the preferable timing on which the RF signal SRF is sampled by the sampling pulse SSP is set to 2T. FIG. 4 shows a record signal SR which is recorded on the optical disk 1, a timing of the sampling pulse SSP for the record signal SR, and eye patterns PT1 to PT4 of the RF signal for the record signal SR. Since the timing of the sampling is defined in the above mentioned manner, as shown in FIG. 2 or FIG. 4, the RF signal SRF obtained from the mirror surface MI can be always sampled.

FIG. 5A shows a timing of the output of the sampling pulse SSP in the case that the time period of the output of the high level signal sent from the mono-multis 11 an 12 is one data bit time period T. In other words, when the time period of the mirror surface detection signal SMI or the record signal SR which goes high is 3T, 4T, 7T, or 11T, the sampling pulse SSP is always output at 2T.

The RF signal SRFO which is sampled at the preferable timing, for example, the time period ranging from t1 to t2, or 2T is sent to a push-pull calculation circuit 13. The push-pull calculation circuit 13 forms a push-pull signal PP in accordance with a groove of the mirror surface MI depending on the signal SRF0 which is sent from the sample and hold circuit 7 and then sends the signal to an ATIP decoder 14. The ATIp decoder 14 is mainly composed of an FM demodulation circuit which is not shown in the figure. The push-pull signal PP which is sent from the push-pull circuit 13 is demodulated and then, the ATIP decoder decodes absolute time data as address information on the order of hours, minutes, and seconds. The absolute time data is obtained from a terminal 15.

As was described above, regardless of whether the time period of the mirror surface detection signal SMI which goes high is long or short, the sampling pulse SSP is formed and sampled in a particular time period after a leading edge of the mirror surface detection signal SMI is detected and then the push-pull signal PP is formed. Thus, it is possible to prevent the signal component of the record signal SR on the optical disk 1 from leaking in the push-pull signal PP. Consequently, the C/N of the push-pull signal PP is improved. In addition, ATIP can be read with high accuracy.

Moreover, since ATIP can be read with high accuracy, a desired position can be located on the readable optical disk 1 before and after data is recorded. Additional data can be readily recorded on the optical disk 1. Furthermore, desired data can be readily recorded at a desired position.

As was described above, in the case of EFM, the pulse train of the record signal SR has a frequency ranging from 200 KHz to 700 KHz. Thus, the frequency of 22.05 KHz±1 KHz of ATIP can be reproduced by the theory of sampling without any problem.

According to an experiment, by the above mentioned sampling, the C/N of 22.05 KHz is improved by 3 to 5 dB. In addition, the error rate of ATIP with sampling, which is in the range from 0 to 5 (every 75 frames, for 1 sec), is improved in comparison with that without sampling, which is in the range from 30 to 40.

In this embodiment, the phase changed type optical disk 1 was described. However, the present invention is not limited to such a disk. Rather, it is possible to apply the present invention to a welded type optical disk.

According to the present invention, an RF signal which is reproduced on a mirror surface of a groove of the optical disk is sampled and held in accordance with a pulse which is formed with the RF signal. With the resultant signal, a push-pull signal is obtained. With the push-pull signal, absolute time data is obtained. Thus, it is possible to prevent a signal component which is recorded on the optical disk from leaking in the push-pull signal. Consequently, the C/N of the push-pull signal can be improved and thereby ATIP can be read with high accuracy.

In addition, since ATIP can be read with high accuracy, a particular position can be allocated on the recordable optical disk before and after data is recorded. Additional data can be readily recorded on the optical disk. In addition, designated data can be readily recorded on a designated position.

Having described a specific preferred embodiment of the present invention with reference to the accompanying drawings, it is to be understood that the invention is not limited to that precise embodiment, and that various changes and modifications may be effected therein by one skilled in the art without departing from the scope or the spirit of the invention as defined in the appended claims.

What is claimed is:

1. An apparatus for reproducing address data recorded on a disk record medium with an information signal which is recorded on the same by forming pit portions in response to the information signal comprising:

means for optically reproducing said recorded data and signals;

means for generating a sampling pulse from said recorded data and signals so that said sampling pulse occurs at a substantially beginning position of a mirror portion between said pit portions;

means for sampling and holding said recorded data and signals by said sampling pulse; and means for decoding an output signal of said sampling and holding means so as to generate said address data.

2. The apparatus according to claim 1, wherein said sampling pulse generating means includes at least one mono-stable multi vibrator.

3. The apparatus according to claim 2, wherein said address data includes an absolute position data indicating at least "hour", "minutes", and "second".

* * * * *

UNITED STATES PATENT AND TRADEMARK OFFICE
CERTIFICATE OF CORRECTION

PATENT NO. : 5,293,368
DATED : March 8, 1994
INVENTOR(S) : Tadashi Nakata

It is certified that error appears in the above-indentified patent and that said Letters Patent is hereby corrected as shown below:

Title page, item [54], Title, col. 1, line 1, should read --APPARATUS FOR REPRODUCING ADDRESS DATA ON A DISK--.

Signed and Sealed this

Thirtieth Day of August, 1994

Attest:

BRUCE LEHMAN

*Attesting Officer*    *Commissioner of Patents and Trademarks*